Sept. 15, 1959 C. F. AULT 2,904,646

DISTRIBUTED AMPLIFIERS

Filed Oct. 23, 1956

INVENTOR.
CYRUS FRANK AULT
BY Darby & Darby
ATTORNEYS 2,904,646

DISTRIBUTED AMPLIFIERS

Cyrus Frank Ault, Clifton, N.J., assignor to Allen B. Du Mont Laboratories, Inc., Clifton, N.J., a corporation of Delaware Application October 23, 1956, Serial No. 617,810

10 Claims. (Cl. 179—171)

This invention relates to distributed amplifiers, and more particularly to a novel circuit which obviates the need for reverse termination.

The usual configuration for distributed amplifiers, in order to completely absorb energy and thus prevent reflections, requires both a reverse terminating resistance and a plate terminating resistance, each having a value equal to the characteristic impedance of the transmission line. These two resistances coact to form a parallel combination whose overall resistance is half the resistance of the individual resistances. This reduced overall resistance not only affects the frequency response of the distributed amplifier, but also produces a plate load impedance which is much lower than the design value of the tube. In the past, an attempt has been made to overcome this weakness by using "tapered impedances" as discussed in paragraph VI of the article on "Distributed Amplification" in the August 1948 issue of the "Proceedings of the IRE." However, the method of tapered impedances requires unusual custom-made elements, a situation which is undesirable.

The principal object of my invention is to provide an improved distributed amplifier.

Another object is to provide an improved one-terminal termination for a distributed amplifier.

A further object is to provide an improved distributed amplifier which produces an output signal, having the same polarity as the input signal.

Figure 1:
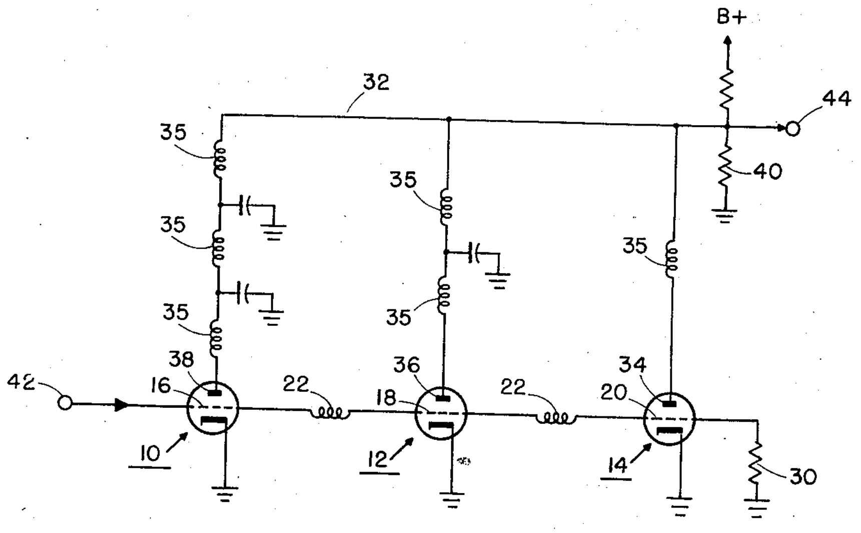
Figure 2:
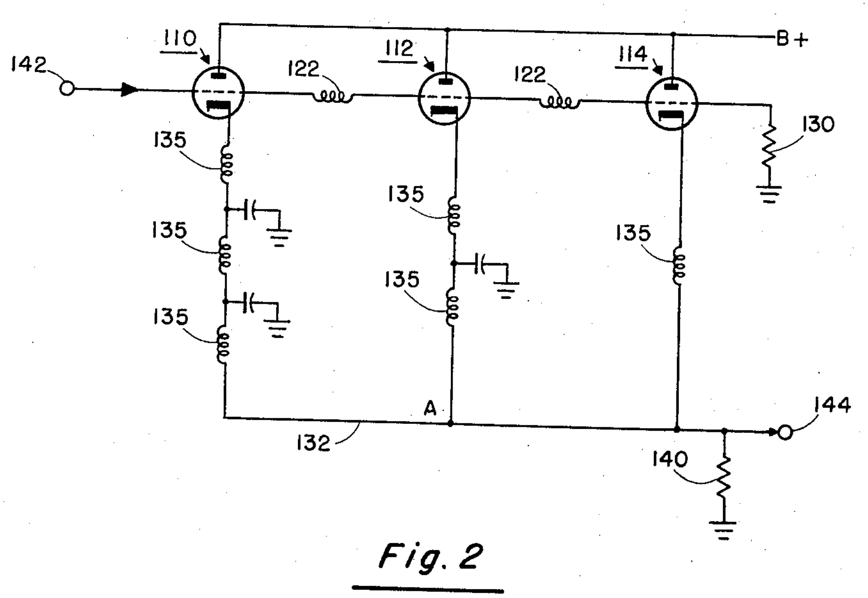

The attainment of these objects and others will be realized from a study of the following specification, taken in conjunction with the drawings, in which, Fig. 1 is a schematic diagram of a distributed amplifier utilizing my invention; and Fig. 2 is another embodiment of my invention.

My invention contemplates a single ended terminated distributed amplifier wherein the delay elements form the tube load impedances which are terminated at one end by the anode resistance of the tube, and at the other end by a simple resistance.

In Fig. 1 there is illustrated a stage of a distributed amplifier utilizing three tubes, but more or less may be advantageously utilized according to the principles to be herein explained.

These tubes 10, 12 and 14 are shown as having their cathodes grounded, and their control grids 16, 18 and 20 series connected by delay elements 22 to form a grid delay line.

Each element of the grid delay line is identical and has a time delay "*t*." Since the design of such delay line elements is well known in the art, their construction will not be discussed in any detail. The grid delay line has the same characteristic impedance regardless of the number of like elements connected in series, and the line is therefore terminated by a resistance 30 having the requisite value. There is practically no power in the grid circuit, and therefore very little power is dissipated by resistance 30.

Each tube is designed to work into a particular plate impedance, and a plate delay line having a suitable impedance characteristic is preferably utilized, although under some conditions this may not be a practical possibility. A bus bar type of conductor 32 is used to interconnect the output electrodes of the tubes. Anode 34 of tube 14 is connected to bus bar 32 with a plate delay line element 35, having the desired characteristic impedance; its length being suitable to produce a delay of "*t*"—the same delay introduced between control grids of the tubes by the grid delay line elements.

Anode 36 of tube 12 is also connected to bus bar 32 with a plate delay line, but this connection is of sufficient length to introduce a delay interval of 2*t*; it may consist of a composite load formed by two similar elements, each the same as element 35. As is well known, two series connected delay line elements having the same characteristic impedance do not alter the characteristic impedance of the overall delay line, but do add their respective delay intervals. Thus, the output electrode of tube 12 also works into its design plate impedance.

Anode 38 of tube 10 is connected to bus bar 32 with a composite load consisting of a plate delay line comprising three elements, each similar to element 35.

Each element 22 of the grid delay line has the same time delay "*t*" as each element 35 of the plate delay line. However, their characteristic impedances may be different, depending upon conditions.

It may be seen that the plate load of each tube is the same, consisting of a different number of series connected identical elements 35. The three composite plate load impedances form a parallel combination whose overall resistance is ⅓ the characteristic impedance of the delay line, and may be terminated in a resistance 40 of this value. In this way, each tube works into its proper design load impedance, and the amplifier may still present a relatively low output impedance. There is thus a relation between the terminating resistance, the number of tubes used in a stage, the characteristic impedance of the plate delay line, and the design parameter of the tubes. Any one, or combination, of these elements may be the determining factor, and the others adjusted accordingly. For example, the output impedance of the amplifier, and thus the terminating resistance, may in some cases be the guiding factor. In another situation the necessary gain, and thus the number of tubes, may be the determining element.

In operation, an input signal (preferably positive going for reasons to be hereinafter discussed) is applied to input terminal 42. As instant T–0 it energizes tube 10. Anode 38 produces an opposite polarity (negative going) output signal which experiences a delay of "*t*" in each element of the anode load resistance, and thus reaches bus bar 32 at time T–3. Since there is no delay in traversing the bus bar this output signal reaches output terminal 44 and plate line terminating resistance 40 at time T–3, and here it is completely absorbed, producing no reflection.

The input signal also traverses the first element 22, of grid delay line experiencing a delay of "*t*," and reaches grid 18 of tube 12 at instant T–1. It energizes tube 12, producing at anode 36 a negative going output signal which traverses the anode delay line and experiences a delay of 2*t*, thus arriving at bus bar 32 at instant T–3.

The applied input signal arrives at grid 20 of tube 14 at T–2 after undergoing a delay of "*t*" in each element 22 of the grid delay line. Tube 14 is thus energized, and the negative going output signal produced at anode 34 experiences an additional delay of "*t*" in traversing element 35, thus arriving at output terminal and terminating resistance 40 at time T–3, the same instant as the output signal from tubes 10 and 12.

It may be seen that all the desired negative going output signals reach the output terminal at the same time, regardless of the tube that does the actual amplification, and thus they all add to form a high amplitude output signal.

It will now be shown that reflections do not seriously impair the output signal. One portion of the output signal from tube 12 has been shown to go toward output terminal 44. At the same time, another portion travels down bus bar 32 toward tube 10, arriving at anode 38 after experiencing three delays of *"t."* Since the design anode impedance of the tube matches the characteristic impedance of the anode delay line, the delay line is properly terminated at its connection to the tube, and any reflected signal is completely absorbed. Various other reflected signals may be followed through the circuit in a similar manner. In each case it will be noted that the reflected signals are absorbed, and thus do not interfere with the desired high amplitude output signal.

As has been explained, the described circuit produces an output signal whose polarity is opposite that of the input signals. In order to utilize this, the subsequent tube must have a quiescent state in which it is conductive, so that the signal from the distributed amplifier may reduce conduction. This type of quiescent state is wasteful of power, and a positive going signal would therefore be desirable.

One solution would be to use a positive going input signal and a circuit which supplies a positive going output signal. This condition is obtainable with a cathode follower configuration. Unfortunately, this configuration does not lend itself readily to a distributed amplifier, since in the prior art circuits the signal encounters a mismatch at the junction of the delay line and the low impedance cathode, and thus produces a multiplicity of reflections.

Fig. 2 illustrates a cathode follower distributed amplifier utilizing my invention to overcome the above objections. In this case the operation is substantially as described above. Each tube has a cathode load of the same characteristic impedance, as explained above, and the parallel combination of cathode impedances is properly matched by resistance 140. If the output signal from the cathode of tube 110 reaches junction A and tries to go toward tube 112, it encounters a high properly valued characteristic impedance termination which would absorb it, while bus bar 132 offers a low impedance output signal path which is properly terminated to absorb reflections.

Of course it will be understood that each output delay line, instead of comprising a number of series connected delay elements, may comprise a single delay element having the necessary characteristic impedance and time delay.

I have disclosed the principles and two embodiments of my invention. However, I desire to be limited not by the foregoing specification or illustrations, but rather by the appended claims.

What is claimed is:

1. A distributed amplifier having an input and an output, said amplifier comprising: a plurality of serially arranged electron discharge devices, said devices being designated as "first," "second," . . . "Nth," starting from the output and proceeding toward the input, each said device having an input electrode and an output electrode; a multiplicity of input delay elements, each having a given characteristic impedance and a delay *"t,"* one of said input delay elements being connected between input electrodes of adjacent electron discharge devices; an input terminal connected to the input electrode of the Nth device, thus forming the input of said amplifier, whereby an input signal applied to said Nth input terminal is progressively delayed before being applied to each subsequent input electrode, said output of said amplifier comprising a bus bar having substantially no delay and substantially no impedance; and individual connections between each said output electrodes and said bus bar, said connections having individual delay characteristics such that their coaction with said input delay elements causes the outputs of the various devices to all arrive at the end of said bus bar at the same time and in the same phase.

2. The apparatus of claim 1 wherein there is only a single output termination for said bus bar, whereby there are no reflections in said bus bar.

3. The apparatus of claim 1 wherein said individual connections between each said output electrode and said bus bar comprise delay lines whose delay is equal to the delay interval *"t"* times the numerical designation of that particular device.

4. The apparatus of claim 1 wherein said individual connections between each said output electrode and said bus bar have a characteristic impedance which is substantially equal to the design load impedance of said device.

5. The apparatus of claim 1 wherein said individual connections between each said output electrode and said bus bar comprise a number of series connected output delay elements, said number corresponding to the designation for that device, each said output delay elements having a characteristic impedance approximately equal to the design load of said device and a delay *"t."*

6. The apparatus of claim 1 wherein said individual connections comprise loads connected between each said output electrode and said bus bar, said loads comprising a delay line whose delay is equal to the delay interval *"t"* times the numerical designation of that particular device, and whose characteristic impedance approaches the design load of said device.

7. The apparatus of claim 6 wherein said output electrodes are the anodes of said devices.

8. The apparatus of claim 6 wherein said output electrodes are the cathodes of said devices.

9. A distributed amplifier having an input and an output, said amplifier comprising: a plurality of serially arranged electron discharge devices, said devices being designated as "first," "second," . . . "Nth," starting from the output and proceeding toward the input, each said device having an input electrode and an output electrode; a multiplicity of input delay elements, each having a given characteristic impedance and a delay *"t,"* one of said input delay elements being connected between input electrodes of adjacent electron discharge devices; an input terminal connected to the input electrode of the Nth device, thus forming the input of said amplifier whereby an input signal applied to said Nth input terminal is progressively delayed before being applied to each subsequent input electrode, said output of said amplifier comprising an output terminal; individual loads connected between each said output electrode and output terminal, each said load having a characteristic delay such that the output of the various devices all arrive at said output terminal at the same time and phase.

10. In a distributed amplifier having an output terminal, a plurality of electron discharge devices each having an input electrode and an output electrode, and input delay elements connected between the input electrodes of adjacent said devices, the improvement comprising: individual loads for each said devices connected between respective said output electrodes of said devices and said output terminal, said loads having such delay characteristics that they coact with said input delay elements to cause the signals from said output electrodes to arrive at said output terminals at the same time and phase.

References Cited in the file of this patent

UNITED STATES PATENTS

| | | |
|---|---|---|
| 2,745,004 | Yeo Pay Yu | May 8, 1956 |
| 2,778,886 | Bradley | Jan. 22, 1957 |

FOREIGN PATENTS

| | | |
|---|---|---|
| 460,562 | Great Britain | Jan. 25, 1937 |